United States Patent [19]
Suehiro et al.

[11] Patent Number: 5,427,752
[45] Date of Patent: Jun. 27, 1995

[54] PROCESS FOR PURIFYING HIGH-TEMPERATURE REDUCING GASES

[75] Inventors: Mitsugi Suehiro, Tokyo; Touru Seto, Hiroshima; Shigeaki Mitsuoka, Hiroshima; Kenji Inoue, Hiroshima; Kazuhiko Shirota, Ube, all of Japan

[73] Assignees: Mitsubishi Jukogyo Kabushiki Kaisha, Tokyo; Ryomei Engineering Co., Ltd., Hiroshima, both of Japan

[21] Appl. No.: 73,652

[22] Filed: Jun. 7, 1993

Related U.S. Application Data

[63] Continuation of Ser. No. 773,195, Oct. 8, 1991, abandoned.

[30] Foreign Application Priority Data

Oct. 8, 1990 [JP] Japan ................... 2-268427

[51] Int. Cl.$^6$ ................ B01D 53/48; B01D 53/52; C10K 1/26; C10K 1/28
[52] U.S. Cl. ................ 423/231; 423/230; 423/244.06
[58] Field of Search ............ 502/50, 52; 423/230, 423/231, 244.06

[56] References Cited

U.S. PATENT DOCUMENTS

| | | | |
|---|---|---|---|
| 4,609,541 | 9/1986 | Calderon | 423/230 |
| 4,857,285 | 8/1989 | Gal | 423/230 |

FOREIGN PATENT DOCUMENTS

| | | | |
|---|---|---|---|
| 78576 | 5/1983 | European Pat. Off. | 423/230 |
| 0328479 | 8/1989 | European Pat. Off. | |
| 2432887 | 3/1980 | France | |
| 3713844 | 10/1987 | Germany | |
| 53-110990 | 9/1978 | Japan | 423/231 |
| 245819 | 11/1986 | Japan | |
| 1-004215 | 1/1989 | Japan | 55/73 |
| 11625 | 1/1989 | Japan | |
| 1-015117 | 1/1989 | Japan | 55/73 |
| 15117 | 1/1989 | Japan | |
| 203020 | 8/1989 | Japan | |
| 2-075320 | 3/1990 | Japan | 55/73 |
| 237613 | 6/1990 | Japan | |
| 2-237613 | 9/1990 | Japan | 55/73 |
| 86105411 | 3/1988 | Switzerland | |
| 2190683 | 11/1987 | United Kingdom | 423/244 |

*Primary Examiner*—Ferris Lander
*Assistant Examiner*—Peter T. DiMauro
*Attorney, Agent, or Firm*—McAulay Fisher Nissen Goldberg & Kiel

[57] ABSTRACT

A process for purifying high-temperature reducing gases containing sulfureous contaminants including hydrogen sulfide and carbonyl sulfide with an absorbent, said process characterized in that at least three reactor towers which are filled with an absorbent are used, and said process comprises the three steps of absorption, regeneration, and reduction, and during in a part of operation two reactor towers are connected in series so as to carry out regeneration, and $O_2$ concentration can be controlled separately for each regenerating reactor tower in the regeneration step, and steam can be supplied so as to prevent excessive reduction of the absorbent from occurring in the reduction step. The life of the absorbent can be extended and operational costs may be reduced.

4 Claims, 2 Drawing Sheets

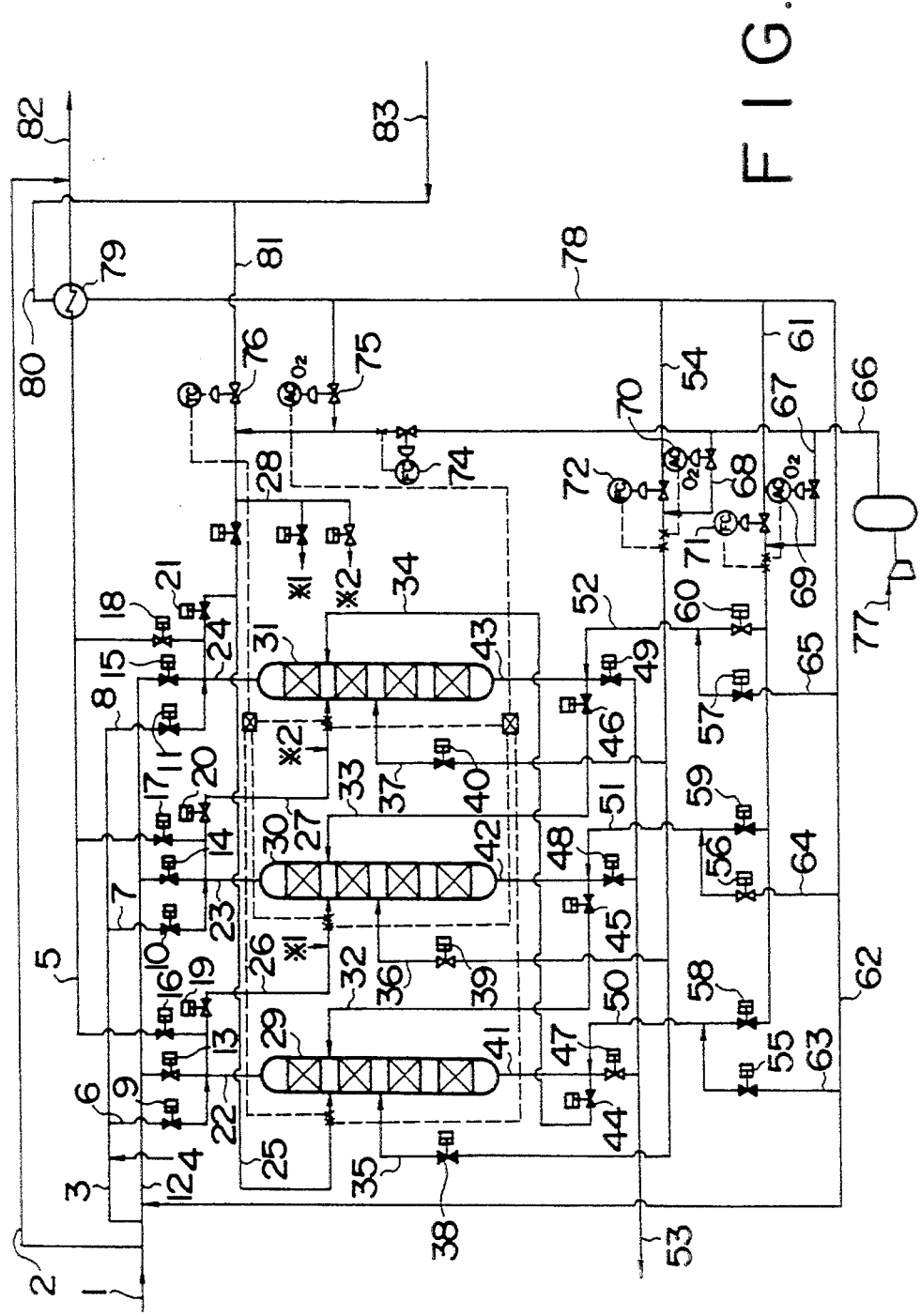
FIG. I

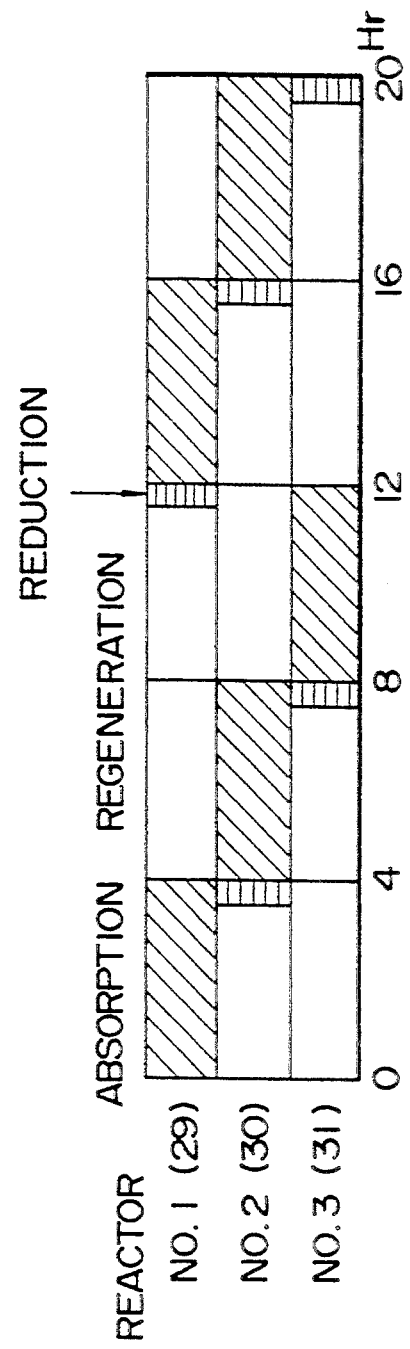

PROCESS FOR PURIFYING HIGH-TEMPERATURE REDUCING GASES

This is a continuation of application Ser. No. 07/773,195, filed Oct. 8, 1991, now abandoned.

FIELD OF THE INVENTION AND RELATED ART STATEMENT

The present invention relates to a process for purifying high-temperature reducing gases, such as those produced in a coal gasification process etc., by which the sulfureous contaminants contained in the high-temperature reducing gas, such as, hydrogen sulfide, carbonyl sulfide and so on, are efficiently removed.

Due to the world-wide depletion of petroleum resources in recent years accompanied by the rise in the purchase price of petroleum oils, it has become necessary to use a diversity of raw materials as fuel and starting materials. In these circumstances, attempts have now been made for developing utilization techniques for efficiently utilizing various carbonaceous resources including, coals, heavy crude petroleums, petroleum asphalts, tars and so on, such as, tar sand oil, shale oil, Taikei crude oil, Maya crude oil, vacuum distillation residue etc. One approach for such technique consists in gasification of various carbon sources.

The gasification product gas of coal or heavy petroleum oils may contain usually, in addition to the intrinsic product components, namely $H_2$ and $CO$, several hundred hundred to several thousand hundred of sulfureous contaminant components, such as, hydrogen sulfide ($H_2S$), carbonyl sulfide (COS) and so on, though the content of such sulfureous contaminants may vary for each-specific starting carbon source. These sulfureous contaminants must be removed in order to avoid problems of environmental pollution and in order to prevent corrosion of instruments and installations due to such sulfureous contaminants.

For realizing the removal of the sulfureous contaminants in a high-temperature reducing gas, a dry process has been employed usually due to the advantages in heat economy and in the simple construction of the process. Thus, in practice, an absorbent consisting mainly of a metal oxide is employed and the sulfureous contaminants are brought into contact with such metal oxide absorbent at a high temperature to cause a reaction of the sulfureous contaminants with the metal oxide to replace the oxygen atom in the absorbent by sulfur atom in the sulfureous contaminants.

As the absorbent metal oxide, oxides of Fe, Zn, Mn, Cu, Mo, W and so on are employed. Upon contact with a sulfureous contaminant compound, such as, hydrogen sulfide, carbonyl sulfide or so on, at a high temperature, e.g. 250°–500° C., the metal oxide reacts with such a sulfur compound to form corresponding metal sulfide. Explaining the reaction for the case of $Fe_2O_3$ with $H_2S$, the desulfurization reaction is believed to proceed as follows:

$$3Fe_2O_3 + H_2 \rightarrow 2Fe_3O_4 + H_2O \tag{1}$$

$$3Fe_2O_3 + CO \rightarrow 2Fe_3O_4 + CO_2 \tag{2}$$

$$Fe_3O_4 + H_2 + 3H_2S \rightarrow 3FeS + 4H_2O \tag{3}$$

$$Fe_3O_4 + CO + 3H_2S \rightarrow 3FeS + 3H_2O + CO_2 \tag{4}$$

The absorbent which has been subjected to such desulfurization reaction is then regenerated into the original metal oxide by oxidizing it with an oxygen-containing gas through the regeneration reaction according to the following reaction formula:

$$4FeS + 7O_2 \rightarrow 2Fe_2O_3 + 4SO_2 \tag{5}$$

The absorption reaction and the regeneration reaction are cyclingly repeated to effect removal of the sulfureous contaminants in a high-temperature reducing gas, such as, product gas of coal or heavy oil gasification, in a continuous manner.

The $SO_2$ gas formed in the regeneration reaction (5) is treated in a separate apparatus by reduction into elementary sulfur which is recovered.

For the absorbent, the metal oxides described above may be used as such or in a form supported on a porous refractory material. For moving bed desulfurization apparatus, in general, an absorbent shaped in a spherical or cylindrical form is employed and, for fixed Led desulfurization apparatus, an absorbent shaped in a honeycomb-like body is employed.

The inventors previously proposed, in the process for purifying high-temperature reducing gases by removing the sulfureous contaminants contained in the high-temperature reducing gas by absorbing them by an absorbent consisting mainly of a metal oxide in a fixed bed system, an improvement (1) which comprises a process step for regenerating the spent absorbent-after having been subjected to the absorption of the sulfureous contaminants by desorbing them with an oxygen-containing gas, a subsequent process step for reducing the so-desorbed absorbent by reducing gas at a high temperature until the concentrations of this reducing gas at the entrance of the reducing reactor and at the exit thereof become equal and, finally, a process step for absorbing the high-temperature reducing gas to be treated, by passing it through a layer of the thus treated absorbent to remove the sulfureous contaminants by absorption in the absorbent, wherein the above three process steps are cyclingly repeated in a continuous manner, so as to stabilize the concentration of the reducing gas in the purified product gas (Japanese Patent Application No. 85412/1985).

The inventors further proposed thereafter, in the process for purifying high-temperature reducing gases by removing the sulfureous contaminants contained in the high-temperature reducing gas by absorbing them by an absorbent consisting mainly of a metal oxide, wherein process steps of reducing the desorbed absorbent by a reducing gas at a high temperature until the concentrations of this reducing gas at the entrance of the reducing reactor and at the exit thereof become equal and absorbing the high-temperature reducing gas to be treated are cyclingly repeated, an improvement (2), which comprises, under the use of at least three reaction towers, repeating cyclingly in a continuous manner the four process steps consisting of an absorption step, a preliminary regeneration step, a regeneration step and a reduction step and flowing the high-temperature reducing gas through a layer of the absorbent to remove the sulfureous contaminants by absorption in the absorbent, so as to stabilize the concentration of the reducing gas in the purified product gas (Japanese Patent Application No. 167814/1987).

The inventors also proposed, in the process for purifying high-temperature reducing gases by removing the sulfureous contaminants contained in the high-temperature reducing gas by absorbing them by an absorbent consisting mainly of a metal oxide, an improvement (3), which comprises repeating cyclingly the four process steps consisting of a step for removing the sulfureous contaminants by absorption in the absorbent, a step for preliminary regeneration in which the spent absorbent after having been subjected to the absorption of the sulfureous contaminants is heated until the temperature required for attaining the regeneration reaction has been reached, a step for regenerating the absorbent reached to the regeneration reaction temperature using an oxygen-containing gas and a step for reducing the regenerated absorbent by a reducing gas at a high temperature until the concentrations of this reducing gas at the entrance of the reducing reactor and at the exit thereof become equal, wherein the process performances of the absorption step and of the regeneration step at lower operation load is stabilized by adjusting the amount of the gas to be recycled in said regeneration step or, in addition thereto, utilizing the heat of combustion of the reducing gas supplied to the reduction step (Japanese Patent Application No. 167815/1987).

The inventors furthermore proposed a process (4) for purifying high-temperature reducing gases, which is characterized by the combination of four process steps consisting of an absorption step for removing the sulfureous contaminants by absorbing them by the absorbent, a step for regenerating the spent absorbent using an oxygen-containing gas, a step for cooling the absorbent after the regeneration and a step for reducing the regenerated absorbent by a reducing gas at a high temperature until the concentrations of this reducing gas at the entrance of the reducing reactor and at the exit thereof become equal, wherein the process performances in the absorption step and in the regeneration step at lower operation load is stabilized by effecting a continuous heat recovery from the high-temperature gas at the exit of the regeneration reactor in the regeneration step (Japanese Patent Application No. 27441/1988).

The inventors further proposed a process (5) for purifying high-temperature reducing gases by removing the sulfureous contaminants contained in the high-temperature reducing gas by absorbing them using an absorbent, which is characterized by, using at least four absorption reaction towers each packed with the absorbent, the combination of three process steps consisting of an absorption step for removing the sulfureous contaminants by absorbing them by the absorbent, a step for regenerating the spent absorbent using an oxygen-containing gas and a step for reducing the regenerated absorbent by a reducing gas at a high temperature, wherein the absorption step is effected in any two of the reactor towers in series flow and the regeneration step is realized in any two of the reactor towers in series flow (Japanese Patent Application No. 055087/1989).

OBJECT AND SUMMARY OF THE INVENTION

The gas purification processes in fixed bed systems as proposed by the inventors mentioned above employ a treatment apparatus consisting of: a reaction system for the process steps composed of an absorption step, a regeneration step and a reduction step; and a recovery system in the downstream for the sulfur recovery by treating the sulfurous dioxide gas formed in the regeneration main step. It has been recognized that it is necessary to develop a further improved apparatus as well as a further improved process, by which any deterioration in the performance of the absorbent during the operation can be suppressed, in order to attain a better performance of the absorbent stable over a prolonged period of time of operation.

The deterioration of the absorbent may be caused by, for example, thermal debasement of the absorbent by the temperature elevation during the regeneration main step, accumulation of contaminant components including sulfur compounds on the absorbent and so on. Upon the removal of the absorbed contaminant components by the oxidation reaction with the oxygen-containing gas in the regeneration main step, a considerable reaction heat is evolved by the exothermic reaction of equation (5), resulting in a temperature rise of the absorbent (for the sake of convenience, the explanation hereinafter is set forth only for oxide of iron as the absorbent). When the absorbent temperature exceeds the thermal tolerable limit, a sintering phenomenon of the oxide of iron constituting the absorbent matrix occurs, resulting in increase in the particle size of the absorbent together with a decrease in the internal surface area thereof and, thus, a decrease in the absorption capacity. For this reason, a contrivance is incorporated in the previous proposals of the inventors mentioned above, that two of the reaction towers are employed for operation in parallel for the regeneration of the absorbent by the oxygen-containing gas with such a partial series operation of these two towers that the exhaust gas from one tower is supplied to a middle portion of the second tower and a cooling measure of these towers by continuing the supply of the regeneration gas even after the termination of the regeneration reaction is employed, in order to prevent thermal deterioration of the absorbent.

There is, however, a shortcoming that the absorbent will nevertheless be heated excessively at the start of the parallel operation of two towers for the regeneration by a violent heat evolution due to the intensive exothermic reaction from $Fe_3O_4$ to $Fe_2O_3$. Therefore, a further improved regeneration system in which the $O_2$-concentration of the regeneration gas can be controlled under compromise among the sulfur content of the contaminants to be absorbed, the regeneration time and so on.

It was, in the course of further study, discovered that an accumulation of sulfur compounds on the absorbent occurs by a side reaction occurring in accompaniment with the main regeneration reaction according to the reaction scheme $$2FeS + SO_2 + 5O_2 \rightarrow Fe_2(SO_4)_3 \tag{6}$$

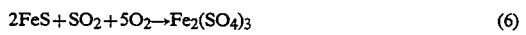

due to a content of small amount of $SO_2$ in the oxygen-containing regeneration gas, since the regeneration gas is prepared by adding air or other oxygen-containing gas to the gas supplied from the exit of the sulfur recovery system which has a small sulfur content mainly in the form of $SO_2$.

Most of this compound $Fe_2(SO_4)_3$ is decomposed in the subsequent reduction step according to the reaction scheme:

$$3Fe_2(SO_4)_3 + 10H_2 \rightarrow 2Fe_3O_4 + 9SO_2 + 10H_2O \tag{7}$$

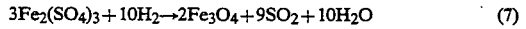

Some portion thereof will, however, be subjected to a reaction according to the reaction scheme $$Fe_2(SO_4)_3 + 10H_2 \rightarrow 2FeS + SO_2 + 10H_2O \tag{8}$$

and the thereby formed sulfurous dioxide will become accumulated in the absorbent, which will cause a loss of the absorption capacity in the corresponding proportion. Therefore, the formation of the compound $Fe_2(SO_4)_3$ should be suppressed as far as possible. For this purpose, it is requested to provide a purification system which can increase the recovery yield in the sulfur recovery system together with a reduction of the sulfur content of the exhaustion gas and which can keep the absorbent which has been subjected to regeneration away from gases containing sulfur.

On the other hand, while the reduction step is assigned primarily for the reduction of $Fe_2O_3$ into $Fe_3O_4$ according to the reaction schemes (1) and (2), there occurs also a CO-shift reaction $$CO + H_2O \rightarrow CO_2 + H_2 \tag{9}$$

as a side reaction in addition to the above-mentioned side reactions according to the reaction schemes (7) and (8), causing thus a partial decrement of the humidity in the reducing gas. The decrease of humidity in the reducing gas tends to cause excessive reduction of $Fe_2O_3$ in the absorbent beyond the formation of $Fe_3O_4$. While such excessive reduction have intrinsically no influence on the subsequent absorption reaction itself, it may cause an increase in the consumption of the reductants CO and $H_2$ upon the reducing reaction, which is undesirable in the view point of energy loss.

The present invention is to provide an improved process for purifying high-temperature reducing gases by eliminating the problems described above.

Thus, the present invention proposes a process for absorbing and removing high-temperature reducing gases containing sulfureous contaminants including hydrogen sulfide and carbonyl sulfide with an absorbent, said process being characterized by using at least three absorption reactor towers packed with an absorbent consisting essentially of three cycling process steps of an absorption step, a regeneration step, and a reduction step, carrying out, during some part of operation, the regeneration step in two of these towers with a series flow of the regeneration gas stream through said two towers, the regeneration step being capable of controlling the $O_2$-concentration in the desorbing gas separately for each regenerating reactor tower, and the reduction step being capable of introducing steam for preventing excessive reduction of the absorbent.

In the process for purifying high-temperature reducing gases according to the present invention, the regeneration of the absorbent which has been subjected to absorption process is carried out by flowing the oxygen-containing regeneration gas in the direction counter to the flow direction in the absorption step (i.e., by a reverse flow). In the regeneration gas introduction part of the absorbed reactor tower to be regenerated, there remains still a considerable amount of unreacted $Fe_3O_4$ which has not participated in the absorption reaction. During the absorption step, the absorption reactions produce product FeS from the upstream portion of the absorbent. A sufficient bulk of unreacted absorbent should be left in the lower portion of the absorbent bed in the reactor tower, so that the portion of Fe components in the absorbent which is converted to FeS is limited, in order to suppress any leakage of the contaminant components, such as $H_2S$, from the outlet of the reactor tower in the absorption step. Here, the heat of reaction evolving during the oxidation of $Fe_3O_4$ to $Fe_2O_3$ is not negligible and has a large influence on the occurrence of local temperature elevation during the regeneration.

By the previous technique of effecting the control of the $O_2$-concentration at one single portion in the regeneration gas flow line, it has been difficult to control the $O_2$-concentration in the $O_2$-containing regeneration gas to a contemplated value so as to suppress a local temperature elevation in the absorbent layer during the regeneration. This difficulty has been remedied by the process according to the present invention by effecting the control of the $O_2$-concentration separately for each reactor tower operating for the regeneration step at its inlet of the regeneration gas supply. In this manner, it is now made possible to realize an $O_2$-concentration control in the manner suitable for each specific sulfurization state of the absorbent in the regeneration reactor tower.

It is desirable to start the regeneration step by supplying an $O_2$-containing gas of a relatively low content of oxygen, in order to avoid a violent exothermic reaction at the beginning period of the regeneration step. This is made possible according to the present invention and, moreover, this is also effective for preventing decrease in the absorption performance due to the accumulation of sulfureous contaminants in the absorbent.

The absorbent in the form of $Fe_3O_4$ is subjected gradually to the oxidation by the $O_2$-containing regeneration gas into $Fe_2O_3$ to complete regeneration. Although the absorbent in the form of $Fe_2O_3$ should be subjected to the subsequent reduction step, because FeS on the upstream-side of the reactor tower consumes almost all of $O_2$ for regeneration compared with the regeneration of $Fe_3O_4$, even when the regeneration of $Fe_3O_4$ (oxidation of $Fe_3O_4$ to $Fe_2O_3$) has been completed the regeneration of FeS is not finished and the regeneration operation has to be continued. When the absorbent in the portion which has already turned to $Fe_2O_3$ is kept in contact with the sulfur-containing regeneration gas, oxygen and a part of sulfur therein react with the absorbent and accumulate in the absorbent, degrading its performance. Therefore, it is desirable for the portion of absorbent which has been regenerated to be brought into contact with a gas which contains oxygen as little as possible. For this reason, the present invention provides a technical measure of supplying the $O_2$-containing regeneration gas to the reactor tower at a portion downstream (see from the entrance of the regeneration gas) from the middle position of the tower in accordance with the amount of remaining FeS. Also, an advantageous effect realized by the separate control of $O_2$ concentration for each reactor tower is that the $O_2$ concentration in the regeneration gas can adequately be selected in accordance with the regeneration time elapsed and with the amount of Fes. This feature will further prevent the deterioration of the absorbent due to the accumulation of sulfur content.

In the time schedule for changing-over of the operations for the reactor towers, it is necessary to carry out the purification process according to the present invention in such a manner that at least one of the three operating reactor towers is in operation for the absorption step, while two of other reactor towers are operating for the regeneration step except that one of these two reactor towers is operated for about one hour in the reduction step. While the change-over of the operation steps for the two reactor towers in the regeneration step is realized at a time interval of about 4 hours, the flow line for the O₂-containing regeneration gas is switched basically before a possible detection of O₂ gas at the outlet of the preceding regeneration reactor tower by a detector means. Thus, the gas from the preceding regeneration reactor tower is introduced into the fourth stage (seen from the entrance of the regeneration gas, assuming that the absorbent is packed therein in four stages) of the following regeneration reactor tower, before O₂ gas becomes existing in this gas, so as to establish a connection of the two regeneration reactor towers to realize regeneration in series of the absorbent in these two towers, in order prevent leakage of O₂ gas into the sulfur recovery system (SO₂ reduction kettle).

By the combined employment of parallel regeneration and series regeneration in this manner, an advantageous feature of effecting the contemplated regeneration of the absorbent is attained without exceeding the thermal tolerance of the absorbent and with suppression of any accumulation of sulfur in the absorbent.

In the reduction step, the coal gas at the inlet of the absorption step is employed as the reducing gas, wherein the amount thereof corresponds to about 10–40% of the high-temperature reducing gas to be purified. The reducing gas is supplied to the reactor tower in operation for the reduction step in the same (forward) direction as the flow in the absorption step. If, in this reducing step, there exist any iron sulfates in the absorbent, the decomposition of the iron sulfates will occur in addition to the reduction of iron in the absorbent. Thus, if there occur iron sulfates during the regeneration step, because the gas from the reducing reactor tower may contain some sulfur compound, such as SO₂ or H₂S, due to possible occurrence of iron sulfates, the gas is guided to an absorption reactor tower for removing such sulfureous component.

According to one of the essential features of the present invention, water steam is introduced into the reducing gas in an amount of 0–100 g/Nm³ (of the reducing gas) in accordance with the moisture content of the reducing gas at the inlet of the reactor tower in operation for the reductio step, in order to prevent any excessive reduction of the absorbent caused possibly due to the occurrence of the CO-shift reaction mentioned above, which decreases the moisture content of the reducing gas. By this feature of steam introduction, an increase of consumption of H₂ and CO incidental to excessive reduction by the reducing gas (coal gas) can be prevented.

The purification process according to the present invention can easily be applied for coal gasification product gas basically under every condition of load for the coal gasification furnace. If the coal gas temperature is in the range of 400°–500° C. in an ordinary operation, the temperature of the coal gas will be in the range from about 300° to 400° C. without exceeding 400° C. in the beginning phase of the operation or in a lower-load operation. The purification process according to the present invention can cope with such a case, by supplying a part of the coal gas to the regeneration reactor tower for supplementing the heat. The inlet gas temperature of the regeneration reactor tower can always be maintained at a temperature requisite for the regeneration, namely, in the range from 400° to 500° C. by causing the gas to ignite in the presence of O₂ under a catalytic action of the absorbent, so as to replenish the requisite heat for heating the inside of the reactor tower.

The purification process according to the present invention also makes it easier to decompose iron sulfate by-produced during the reduction step, in addition to the regeneration of the absorbent, by supplementing heat to the regeneration system. Since the reduction and the decomposition of iron sulfates become slow and difficult to proceed if the temperature inside the reactor tower in the reduction step does not exceed 400° C., a reduction treatment of the absorbent within the controlled time interval becomes difficult. It is therefore necessary to maintain the inlet gas temperature of the reactor tower in the regeneration step always in the range from 400° to 500° C. over the entire load range by supplementing heat as necessary in case of low operation load.

As explained above, the present invention provides a process for purifying high-temperature reducing gases which is improved in the points of protection of the absorbent, stability of the absorption and regeneration performance and so on.

Below, the present invention will further be described in detail by way of embodiments.

BRIEF DESCRIPTION OF THE DRAWINGS

FIG. 1 is an explanatory flow diagram of one embodiment of the apparatus for realizing the process according to the present invention.

FIG. 2 illustrates a typical time schedule of one embodiment of the process according to the present invention.

DETAILED DESCRIPTION OF PREFERRED EMBODIMENTS

In FIG. 1, the supply lines for the dust-removed high-temperature reducing gas containing sulfureous contaminants are indicated by 1, 2, 3 and 12. By the numerals 9, 10, 11, 13, 14 and 15, flow line change-over valves are indicated. By the numerals 16, 17, 18, 19, 20 and 21, the change-over valves for the gas containing SO₂ exhausted from the reactor towers operating in the regeneration step are indicated. The reactor towers 29, 30 and 31 are packed with the absorbent in four stages. The flow line change-over valves 38, 39, 40, 47, 48, 49, 58, 59 and 60 supply the requisite regeneration gas to the reactor towers operating in the regeneration step. The flow line change-over valves 44, 45 and 46 will serve for supplying the exhaust gas from the reactor tower in the reduction step to the second stage of the reaction tower operating in the absorption step. The flow line change-over valves 55, 56 and 57 serve for supplying the gas having no O₂ content, which has been subjected to the sulfur recovery treatment, to the reaction towers for purging. Water steam for use in the reduction step is supplied via a line 4. Numeral 5 indicates the outlet gas line of the regeneration reactor tower. The reducing gas for use the reduction step is supplied via each supply line 6, 7 or 8 to each of the reactor towers. Lines 22, 23 and 24 conduct the high-temperature reducing gas to be absorbed. Lines 25, 26 and 27 connect two of the reactor towers in series for regeneration. Lines 22, 23 and 24 supply the gas from the outlet of a reducing tower to an absorbing reactor tower. Lines 35, 36 and 37 serve for supplying the regeneration gas to each of the reaction towers. The purified product gas is guided out from the line 53. Through lines 78, 80 and 83, the gas for the regeneration is supplied. A line 81 is a branch line from the line 83. Numerals 54 and 61 indicate branch lines of the line 78 to which air or an oxygen containing gas is supplied through lines 66, 67 and 68. A line 62 is for a gas which does not contain air or oxygen and has branch lines 63, 64 and 65 and is used for purging the reactors.

Numeral 79 indicates a heat exchanger. A line 82 supplies a regeneration gas containing sulfur compounds from the $SO_2$ towers to the sulfur recovery system. Numerals 69, 70, 71, 72, 74, 75, and 76 indicate flow control valves.

Numerals 41, 42 and 43 represent either outlet lines of absorbing towers or inlet lines of regenerating towers, and 50, 51 and 52 indicate lines for the gas for regeneration which has passed through the sulfur recovery system and to which air or oxygen has been added, and these lines introduce the regeneration gas to the inlets of regenerating towers.

A line 28 branches the gas having passed through the sulfur recovery system, and air or oxygen is added to this line 28. Lines *1 and *2 supply air or oxygen to the lines 26 and 27 for connecting regenerating towers in series.

A line 77 supplies air or oxygen.

In the embodiment shown in FIG. 1, three reactor towers 29–31 of the same construction each packed with four stages of the absorbent are shown as operating in the absorption step according to the reactions (3) and (4) or the regeneration step according to the reactions (1) and (2) and these operation steps are cyclically changed-over for the reactor towers. Here, it is to be noted that the present invention should not be restricted for the use of fixed bed apparatus, and may be possible to apply also to a fluidized bed apparatus and a moving bed apparatus, so long as the absorption of sulfur compounds in a reducing gas using an absorbent and the regeneration according to reaction (5) are repeated in the process to be carried out in such an apparatus. It is of course possible to employ apparatuses having more than three reactor towers of fixed bed type.

While the process according to the present invention has no limitation as to the composition and configuration of the absorbent, an explanation will be made in the following for the case of using $Fe_2O_3$ as the absorbent.

The high-temperature reducing gas containing sulfureous contaminants, such as, $H_2S$, COS and so on in the line 1 may be a coal gasification product gas which has been subjected to dust removal up to a residual dust concentration of about 10 mg/$Nm^3$. This gas may contain, in addition to the dust content, other contaminants, such as $H_2S$, COS, $NH_3$ and elementary halogen each in an amount in the range from several tens hundred to several thousands hundred, while the content and the contaminants may vary in accordance with each specific starting coal and processes employed. The gas temperature at the exit of the gasification furnace may be in the range from 250° to 500° C. after heat recovery. The pressure of the gas may usually be in the range from ordinary pressure to 25 kg/$cm^2$G, while this may vary in accordance with the gasification furnace employed.

The embodiment of FIG. 1 shows the manner of operation of the apparatus for the regeneration step in the reactor towers 30 and 31 and for the absorption step in the reactor tower 29.

FIG. 2 illustrates the time schedule to be applied in the above embodiment of FIG. 1 for the absorption, regeneration and reduction steps, wherein the reactor towers 29–31 are indicated as Nos. 1–3, respectively.

The operational aspect of the embodiment shown in FIG. 1 will now be explained assuming that the apparatus is in the operation period of 12th to 15th hours in the time schedule shown in FIG. 2.

Dust-removed gasification product gas supplied from the line 1 is fed to the reactor tower 29 through the line 22 via the change-over valve 13. In this reactor tower, sulfureous contaminants, such as, $H_2S$, COS and so on, are removed by being absorbed in the absorbent according to the reaction schemes (3) and (4) usually at temperatures of 300°–500° C. The purified gas is supplied from the line 53 via the change-over valve 47 to a gas turbine (not shown).

On the other hand, the reactor towers 30 and 31 are operating in the regeneration step.

In this regeneration step, the gas from the outlet of the sulfur recovery system is supplied to the line 54, which branches out from the line 78, after being heated through the heat exchanger 79 to a temperature of about 400° C. To the line 54 is supplied air or other $O_2$-containing gas from the line 77 via line 68. The resulting $O_2$-containing gas is fed to the middle portion of the reactor 30 from the line 36 via the change-over valve 39. As seen from FIG. 2, the reactor tower 30 has here been in the operation of the regeneration step for four hours since the beginning of the regeneration step. Thus, FeS in the absorbent in the third and fourth counted from the upper end of the reactor stages has now converted completely into $Fe_2O_3$ and, thus, is in the state of the completion of the regeneration step. Thus, there is now no problem for the reactor tower 30 even if the reducing gas is supplied at the middle portion of the tower.

In the first and second stages, counted from the upper end of the reactor 30, the absorbent exists in a state in which unregenerated FeS and partially regenerated $Fe_2O_3$ are present simultaneously. By introducing the regeneration gas at the middle portion of the tower, FeS existing in the absorbent will gradually be converted into $Fe_2O_3$. Immediately after the introduction of the regeneration gas, the gas from the outlet 23 of the reactor tower 30 contains no oxygen, since all the oxygen in the regeneration gas is consumed by the regeneration reactions. However, after the regeneration reactions have proceeded to a certain degree and become closer to the completion of regeneration, the gas from the outlet 23 of the reactor tower 30 begins to contain $O_2$. If such an $O_2$-containing gas is conducted to the sulfur recovery system via the lines 5 and 82, reactions of the $O_2$ with $H_2$ and CO may occur, resulting in a corresponding loss of $H_2$ and CO which can otherwise be utilized for the reduction of $SO_2$ in the sulfur recovery system. Therefore, the gas from the reactor tower 30 should be supplied to the stage second from the upper end of the reactor tower 31 operating now in the regeneration step via the line 23, the change-over valve 20 and the line 27, by the time any oxygen gas becomes present in the gas from the outlet of the reactor 30 and is detected.

Since the reactor tower 31 is now at the state in which only a little time has elapsed from the start of the regeneration step, any oxygen contained in the supplied gas will completely be consumed by the regeneration reactions, so that there is no possibility of presence of $O_2$ in the gas from the outlet line 24 of the reactor tower 31.

On the other hand, an $O_2$-containing regeneration gas or air corresponding to the requisite regeneration reactions is fed to the reactor tower 31 through the branch line 61 of the regeneration circulation line 78 from the line 67 via the valve 60, the line 52 and finally the line 43.

The $O_2$ concentration in the regeneration gas supplied to the reactor towers 30 and 31 can be controlled separately by the flow control valves 70 and 69 and the concentration is determined under consideration of the time from the start of the regeneration and the thermal tolerance of the absorbent. A violent exothermic reaction of $Fe_3O_4$ to $Fe_2O_3$ tends to occur, in particular, at the beginning phase of the regeneration. Therefore, the regeneration should be started first using a low $O_2$-content regeneration gas by controlling the valve 69.

By improving the regeneration system for regenerating the absorbent according to the present invention, advantageous effects, such as protection of the absorbent against high-temperature gases, prevention of decrease in the absorbent capacity due to accumulation of sulfur compounds in the absorbent, and extension of the operation life of the absorbent, can be achieved.

By the change-over of the corresponding valves, the reactor tower 30, which has finished the regeneration step, is changed over to the following reduction step. The reducing gas (a coal gasification product gas is employed in this embodiment) is supplied to the reactor tower 30 via the lines 1, 3 and 7, the valve 10, and finally the line 23. In this reduction step, the principal reducing reactions of $Fe_2O_3$ into $Fe_3O_4$ occur [according to the reaction schemes (1) and (2)] together with the accompanying side reactions of decomposition of sulfates such as $Fe_2(SO_4)_3$, if such compounds are accumulated, in accordance with the reaction schemes (6) and (7). Therefore, the gas from the outlet line 42 of the reactor tower 30 operating in the reduction step may contain sulfur compounds, such as $SO_2$ and $H_2S$. In order to remove such sulfur compounds, this gas is supplied to the second stage of the reactor tower 29 operating now in the absorption step via the change-over valve 45 and the line 32 to be treated for such sulfur components.

During the reduction step, a partial CO-shift reaction may occur, as explained above, causing thus a decrease of the moisture content in the reducing gas, which may cause the excessive reduction of $Fe_2O_3$ contained in the absorbent. Such excessive reduction of $Fe_2O_3$ is undesirable because of additional and unnecessary consumption of $H_2$ and CO. For preventing such excessive reduction, steam is supplied in an amount of 0–100 g/Nm$^3$ (based on the reducing gas) via the line 4 to the line 3.

The operation of the reduction step will be terminated after about an hour and the reactor tower is changed over to the absorption step. Upon changing-over of the reactor tower 30 from the reduction step, the reactor tower 29 is changed-over from the absorption step to the regeneration step and the reactor tower 31 from the first half period of the regeneration step to the last half period thereof and the operations for these steps as explained above are repeated (see FIG. 2).

After repeating the series of operations, the absorbent may be subjected to accumulation of sulfur compounds after some time in accordance with the reaction schemes (6) and (7). If such a condition may occur and sulfur components cannot be further absorbed in the absorption step, such a situation may be dealt with by repeating the operations of reduction and regeneration and by the ensuing reactions according to the reaction schemes (5), (7) and (8).

Through the course of the above described series of operations, the sulfur compounds, such as $Fe_2(SO_4)_3$, may be converted by the decomposition reactions via FeS into $Fe_2O_3$, so that the restoration of the absorbent can be attained relatively easily.

During a lower-load operation, it may be difficult to maintain the requisite regeneration temperature of 400°–500° C. due to insufficient reaction heat during the regeneration step because of a decreasing percentage of sulfur in the desulfurization step. To cope with such a circumstance, some coal gas can be introduced into the reactor tower via the lines 35, 36 and 37 or via the lines 50, 51 and 52 to effect combustion of the coal gas on the absorbent, whereby it is now possible to maintain the inlet gas temperature of the regeneration reactor tower at 400°–500° C. By maintaining the regeneration reactor tower inlet gas at temperatures above 400° C. not only the regeneration reactions of the absorbent, but also the reducing and the decomposition reactions of the iron sulfate contained in the absorbent can proceed smoothly and the series of operations can be effected without delay.

Now, the explanation is directed to the purge of the reactor tower to be effected before and after the regeneration step.

The internal space of the reactor tower 29 after the finish of the absorption step should be purged with a reducing gas before being changed-over to the regeneration step. As the purge gas, the gas which does not contain oxygen is supplied from the outlet of the sulfur recovery system (not shown) via the lines 80 and 78, 62, the branch line 63, the line 50 and finally the line 41, to the reactor tower 29 to purge it. The gas from the purge operation contains sulfureous compounds and, therefore, it is supplied to the reactor tower 30, operating now in the absorption step, at the portion beneath the first stage via the line 26.

Next, the purge process before changing-over to the reduction step after the completion of the regeneration step is described.

Now, we assume that the reactor tower 31 is to be switched over to the purge process after the completion of the regeneration step. The reactor tower 31 is purged in such a manner that the outlet gas from the sulfur recovery system having no $O_2$ content is guided via the lines 62, 65, 52 and 43 to the reactor tower 31 and is passed therethrough in the counter flow fashion with respect to the flow direction in the absorption step as in the above-described case of the purge after the absorption step. The gas after the purge operation from the reactor tower 31 contains $O_2$ gas, and this is treated by supplying to the reactor tower 29, operating now in the regeneration step, at a point just beneath the first stage.

In this manner, the reactor can be purged before and after the regeneration step by supplying the reactor tower with the outlet gas from the sulfur recovery system having no $O_2$ content.

In the process according to the present invention, at least three reactor towers each packed with the absorbent are employed, and the three steps of absorption, regeneration, and reduction are carried out. In the regeneration step, two reactor towers are operated partially in series, and the $O_2$ content is controlled in the regeneration gas supplied to these two reactor towers separately for each reactor tower.

By supplying steam to the reducing gas during the reduction step, the occurrence of excessive reduction of iron oxides can be prevented, and the extension of the operational life of the absorbent can be attained by preventing the deterioration due to accumulation of sulfur compounds in the absorbent and the thermal deterioration together with the suppression of superfluous consumption of the reducing gas, such as $H_2$ and CO, so that a considerable contribution to the extension of operational life of the absorbent as well as reduction of the operational costs can be realized.

What is claimed is:

1. A process for absorbing and removing sulfurous compounds, including hydrogen sulfide and carbonyl sulfide, from high temperature reducing gases comprising treating the gases in at least three fixed bed reactor towers connected in parallel or series, said towers being filled with an iron oxide absorbent for the sulfurous compounds, wherein the step of absorption of the sulfurous compounds is carried out by passing the gases through the absorbent, a step of regeneration of the absorbent is carried out by passing an oxygen containing gas through the absorbent, and a reducing step of the regenerated absorbent is carried out by passing a reducing gas through the regenerated absorbent, wherein said regeneration step is carried out on absorbent in two of the towers connected in series, and wherein the oxygen concentration is controlled separately for each of the towers during said regeneration step, wherein the oxygen containing gas is supplied to a middle portion of a reactor tower when it is operating in a second half stage of the regeneration step, and gas coming out of said reactor tower operating in the second half stage of the regeneration step is fed to another reactor tower operating in a first half stage of the regeneration step, so that the regeneration step starts with a supply of gas containing lower concentrations of oxygen than those during said second half stage of the regeneration step, and wherein steam is supplied during the reduction step to prevent reduction of iron oxide in the absorbent to FeO or Fe so as to avoid an increase in the consumption of CO and $H_2$.

2. A process as claimed in claim 1, wherein the reactor towers are purged with a gas which does not contain $O_2$ before and after the regeneration step.

3. A process as claimed in claim 1, wherein the high-temperature reducing gas is a product gas of gasification of coal or heavy oil.

4. A process as claimed in claim 1 wherein said gas discharged from said reactor tower operating in the second half of the regeneration step is fed to said reactor tower operating in the first half of the regeneration step at a position located downstream of the oxygen containing gas flow relative to said middle portion of said reactor operating in the first half of the regenerating step.

* * * * *